US012401940B2

(12) United States Patent
Park et al.

(10) Patent No.: US 12,401,940 B2
(45) Date of Patent: Aug. 26, 2025

(54) SPEAKER MODULE AND ELECTRONIC DEVICE INCLUDING SPEAKER MODULE

(71) Applicant: Samsung Electronics Co., Ltd., Suwon-si (KR)

(72) Inventors: Youngbae Park, Suwon-si (KR); Changshik Yoon, Suwon-si (KR); Kiwon Kim, Suwon-si (KR); Joohan Kim, Suwon-si (KR); Taeeon Kim, Suwon-si (KR); Jinju Bae, Suwon-si (KR); Incheol Baek, Suwon-si (KR); Myungcheol Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 280 days.

(21) Appl. No.: 18/164,057

(22) Filed: Feb. 3, 2023

(65) Prior Publication Data

US 2023/0188888 A1 Jun. 15, 2023

Related U.S. Application Data

(63) Continuation of application No. PCT/KR2021/010146, filed on Aug. 3, 2021.

(30) Foreign Application Priority Data

Aug. 4, 2020 (KR) ........................ 10-2020-0097104

(51) Int. Cl.
*H04R 1/28* (2006.01)
*H04R 1/44* (2006.01)

(52) U.S. Cl.
CPC ................. *H04R 1/28* (2013.01); *H04R 1/44* (2013.01); *H04R 2499/11* (2013.01)

(58) Field of Classification Search
CPC ......... H04R 1/28; H04R 1/44; H04R 2499/11
See application file for complete search history.

(56) References Cited

U.S. PATENT DOCUMENTS 6,526,150 B2 2/2003 Kelley et al.
9,036,857 B2 5/2015 Zellner, Jr. et al.
(Continued)

FOREIGN PATENT DOCUMENTS

JP 2000013880 A 1/2000
JP 2017117895 A 6/2017
(Continued)

OTHER PUBLICATIONS

International Search Report with Written Opinion for International Application No. PCT/KR2021/010146; Application Filing Date Aug. 3, 2021; Date of Mailing Nov. 18, 2021 (10 pages).
(Continued)

*Primary Examiner* — Mark Fischer
(74) *Attorney, Agent, or Firm* — CANTOR COLBURN LLP

(57) ABSTRACT

An electronic device comprises a speaker module which includes a speaker unit and a first speaker housing that is coupled to the speaker unit in a first direction. The first speaker housing accommodates the speaker unit, and is arranged in the inner space of the electronic device. An opening for radiating sound allows the inner space of the electronic device to communicate with the outside, and an acoustic passage connects the opening for radiating sound and a portion from which a sound is radiated by the speaker unit of the speaker module. The speaker module can further include an airtight member for sealing a gap between the speaker module and the acoustic passage so that the sound radiated from the speaker unit is transmitted to the acoustic passage.

18 Claims, 15 Drawing Sheets

(56) References Cited

U.S. PATENT DOCUMENTS

| | | | |
|---|---|---|---|
| 9,661,410 | B1 | 5/2017 | Iwai et al. |
| 9,999,149 | B2 | 6/2018 | Jun et al. |
| 10,462,557 | B1 | 10/2019 | Chan |
| 10,602,249 | B2 | 3/2020 | Jung et al. |
| 10,609,461 | B1 | 3/2020 | Lo |
| 10,911,848 | B2 | 2/2021 | Yoon et al. |
| 11,109,144 | B2 | 8/2021 | Park et al. |
| 2014/0369533 | A1 | 12/2014 | Kim et al. |
| 2016/0165327 | A1 | 6/2016 | Crosby et al. |

FOREIGN PATENT DOCUMENTS

| | | | |
|---|---|---|---|
| KR | 20000015523 | U | 8/2000 |
| KR | 20140145068 | A | 12/2014 |
| KR | 20170100368 | A | 9/2017 |
| KR | 20180045300 | A | 5/2018 |
| KR | 101922217 | B1 | 12/2018 |
| KR | 20190021056 | A | 3/2019 |
| KR | 20190127184 | A | 11/2019 |
| KR | 20200072056 | A | 6/2020 |

OTHER PUBLICATIONS

Korean Office Action corresponding to Application No. 119981042713; Dated Dec. 13, 2024.

SPEAKER MODULE AND ELECTRONIC DEVICE INCLUDING SPEAKER MODULE

TECHNICAL FIELD

Various embodiments disclosed in the present document relate to a speaker module and an electronic device including the speaker module.

Background Art

A speaker module including a speaker unit for reproducing a sound may be included in an electronic device. Also, the interest of users in acoustic performance is increasing because an increasing amount of content is being reproduced through electronic devices.

In consideration of the convenience of assembling the electronic device, the speaker unit is manufactured in the form of a speaker module.

An electronic device having dustproof and waterproof functions should be able to block external foreign substances and moisture that may be introduced through a hole for transmitting a sound radiated from the speaker unit to the outside of the electronic device. In consideration of such airtightness, an adhesive material having a waterproof function may be used.

DISCLOSURE OF INVENTION

Technical Problem

In the case of using an adhesive material having a waterproof function in consideration of dust and water resistance, a compression process for attaching the adhesive material to an appliance may be required. Electronic components or speaker modules of the electronic device may be damaged during the compression process.

In addition, a housing for accommodating the speaker unit may include a structure capable of separating a space through which sounds having opposite phases are transmitted so that sounds having opposite phases radiated from the speaker unit are not canceled. In the case that the volume occupied by the housing accommodating the speaker unit increases for space separation, the utilization efficiency of the inner space of the electronic device may decrease.

Solution to Problem

According to various embodiments disclosed in the present document, it is possible to provide a speaker module and an electronic device capable of improving the inner space utilization of the electronic device, as well as providing an airtight structure that does not require a separate compression process while ensuring dustproof and waterproof functionality.

An electronic device according to various embodiments disclosed in the present document may comprise a speaker module which includes a speaker unit and a first speaker housing that is coupled to the speaker unit in a first direction and accommodates the speaker unit, and which is arranged in the inner space of the electronic device; an opening for radiating sound which allows the inner space of the electronic device to communicate with the outside; and an acoustic passage connecting the opening for radiating sound and a portion from which sound is radiated by the speaker unit of the speaker module, wherein the speaker module can further include an airtight member which seals a gap between the speaker module and the acoustic passage so that the sound radiated from the speaker unit is transmitted to the acoustic passage.

A speaker module according to various embodiments disclosed in the present document may further include a speaker unit, a first speaker housing that is coupled to the speaker unit in a first direction and that accommodates the speaker unit, and an airtight member sealing the acoustic passage connecting the speaker unit and a portion from which a sound is radiated by the speaker unit.

Advantageous Effects of Invention

According to various embodiments disclosed in the present document, because a compression process is not required in the process of installing the speaker module to the electronic device, the risk of damage to an electronic component and the speaker module that may occur in the compression process can be eliminated. In addition, it is possible to improve the utilization efficiency of the inner space of the electronic device.

BRIEF DESCRIPTION OF DRAWINGS

In connection with the description of the drawings, the same or similar reference numerals may be used for the same or similar components.

MODE FOR THE INVENTION

Figure 1:
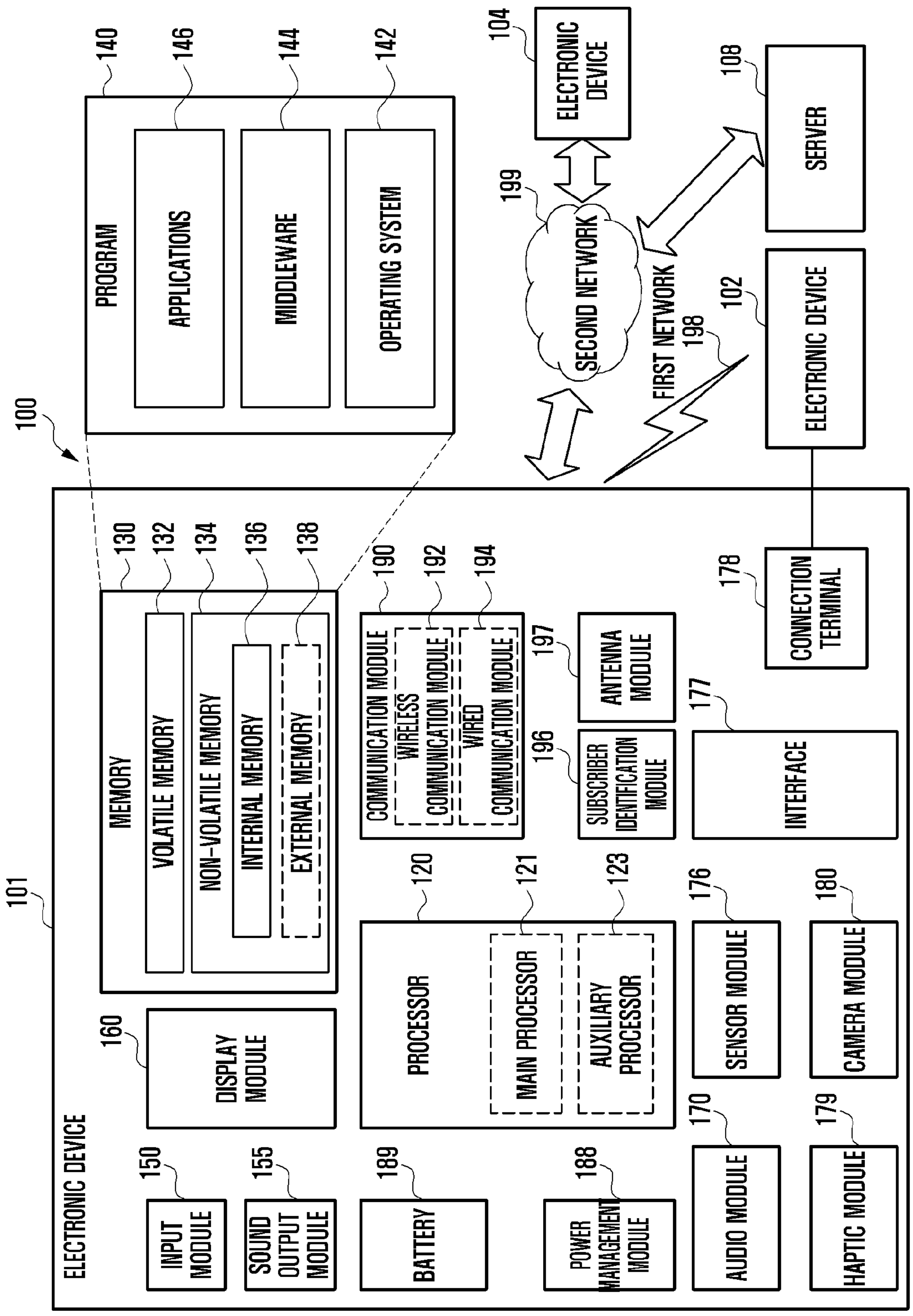
FIG. 1 is a block diagram of an electronic device in a network environment, according to various embodiments.

It should be appreciated that various embodiments of the disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., the first element) is referred to, with or without the term "operatively" or "communicatively", as "coupled with", "coupled to", "connected with", or "connected to" another element (e.g., the second element), it means that the element may be coupled with the other element directly (e.g., wiredly), wirelessly, or via the third element.

FIG. 1 is a block diagram illustrating an electronic device 101 in a network environment 100 according to various embodiments. With reference to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134. In addition, the non-volatile memory 134 may include internal memory 136 and/or external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa.

According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI).

According to an embodiment, commands or data may be transmitted or received between the electronic device 101 and the external electronic device 104 via the server 108 coupled with the second network 199. Each of the electronic device 102 or 104 may be a device of a same type as, or a different type, from the electronic device 101. According to an embodiment, all or some of operations to be executed at the electronic device 101 may be executed at one or more of the external electronic device 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) on the basis of 5G communication technology or IoT-related technology.

Figure 2A:
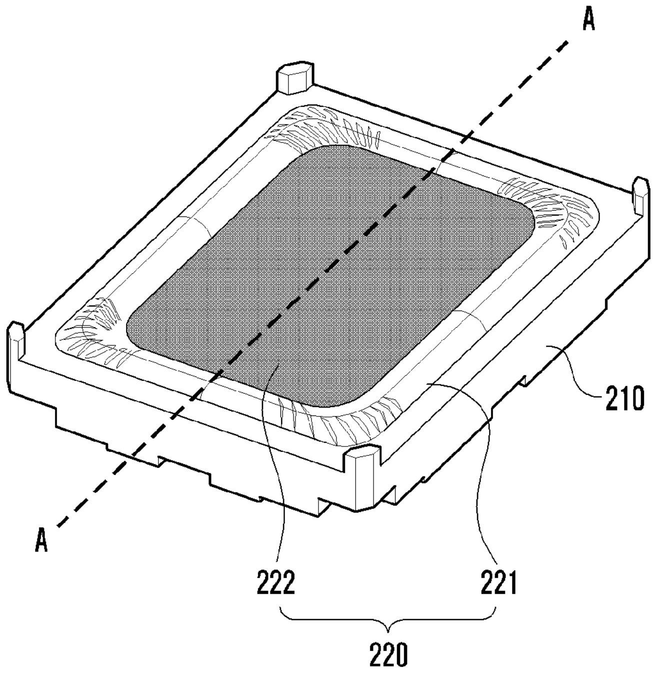
FIG. 2*a* is a perspective view of a speaker unit according to various embodiments disclosed in the present document.
Figure 2B:
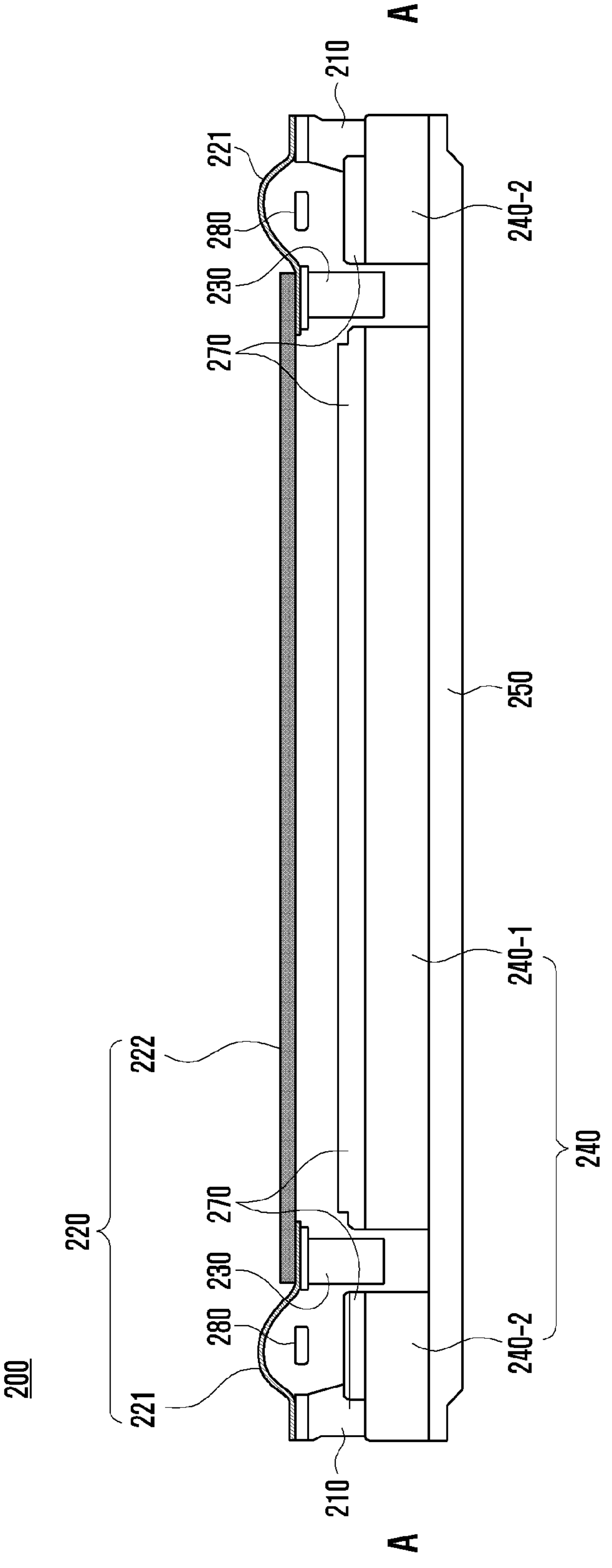
FIG. 2*b* is a cross-sectional view of the speaker unit shown in FIG. 2*a* taken along line A-A.

FIG. 2*a* is a perspective view of a speaker unit according to various embodiments disclosed in the present document. FIG. 2*b* is a cross-sectional view of the speaker unit shown in FIG. 2*a* taken along line A-A.

The speaker unit 200 according to various embodiments disclosed in the present document may refer to a device that is disposed in an electronic device (e.g., the electronic device 101 of FIG. 1) and outputs a sound. The speaker unit 200 may receive an audio signal processed through an audio module (e.g., the audio module 170 of FIG. 1) of the electronic device in accordance with execution of an application or a function, and it may output the signal as a sound. For example, the speaker unit may be the sound output device of FIG. 1 (e.g., 155 of FIG. 1).

According to various embodiments, a unit frame 210 may support various components included in the speaker unit 200. The shape of the unit frame 210 shown in FIGS. 2*a* and 2*b* is only an example, and the shape of the unit frame 210 is not limited to the shape shown in FIGS. 2*a* and 2*b*. The unit frame 210 may be manufactured in various forms according to a space in which the speaker unit 200 is to be disposed. The unit frame 210 may be formed of various materials. For example, the unit frame 210 may be formed of a synthetic resin material.

According to various embodiments, as shown in FIGS. 2*a* and 2*b*, a vibrating member 220 may be supported by at least a portion of the unit frame 210. A voice coil 230 may be coupled to at least a portion of the vibrating member 220. The vibrating member 220 may be vibrated by the movement of the voice coil 230. In an embodiment, the vibrating member 220 may include a first vibrating unit 221 and a second vibrating unit 222. At least a portion of the first vibrating unit 221 may be supported by the unit frame 210. The first vibrating unit 221 may be formed of a flexible material. The first vibrating unit 221, for example, may be formed of an elastomer, a synthetic resin, a thin metal plate, rubber, or a film. At least a portion of the second vibrating unit 222 may be coupled to the first vibrating unit 221. The second vibrating unit 222 may be formed of a material that is relatively harder than the first vibrating unit 221 (e.g., a material having a relatively higher elastic modulus than that of the first vibrating unit 221). For example, the second vibrating unit 222 may be formed of a metal, a synthetic resin, or an alloy. With reference to FIG. 2*a*, the first vibrating unit 221 may be disposed on the outer periphery of the unit frame 210, and the second vibrating unit 222 may be supported by the first vibrating unit 221. The first vibrating unit 221 formed of a flexible material may vibrate by the movement of the voice coil 230 coupled to the vibrating member 220, and the second vibrating unit 222 supported by the first vibrating unit 221 may vibrate together with the first vibrating unit 221 by the vibration of the first vibrating unit 221. A sound may be generated by the vibration of the vibrating member 220. In another embodiment, the vibrating member 220 may be formed of a single material without being divided into the first vibrating unit 221 and the second vibrating unit 222.

According to various embodiments, the voice coil 230 may be formed by winding an electric wire (not shown). In the case that a current flows in the voice coil 230, the voice coil 230 may vibrate up and down because of the repulsive force between the magnetic field formed by the current flowing in the voice coil 230 and the magnet 240 adjacent to the voice coil 230. As described above, the vibrating member 220 fixed to the voice coil 230 may vibrate by the vibration of the voice coil 230. A sound may be output by vibration of the vibrating member 220. Vibration of the voice coil 230 may be controlled by a current flowing in the voice coil 230.

According to various embodiments, an electronic circuit 280 may be electrically connected to a printed circuit board (not shown) of an electronic device (e.g., the electronic device 101 of FIG. 1) to apply an electrical signal to the voice coil 230. The electronic circuit 280 may be formed of a material having elasticity. The electronic circuit 280 may be disposed adjacent to the vibrating member 220 to regulate the degree of vibration (e.g., damping ratio) of the vibrating member 220.

According to various embodiments, a magnet 240 may be disposed on a yoke 250. The yoke 250 may be formed of a magnetic material. For example, the yoke 250 may be formed of a magnetic metal or a material including a magnetic metal.

According to various embodiments, the magnet 240 may include a first magnet 240-1 and a second magnet 240-2. As shown in FIG. 2*b*, the first magnet 240-1 may be a magnet disposed on the central portion of the yoke 250 and the second magnet 240-2 may be a magnet disposed on the side of the yoke 250. The voice coil 230 may be disposed between the first magnet 240-1 and the second magnet 240-2.

According to various embodiments, a plate 270 may be disposed to cover at least a portion of the magnet 240. The plate 270 may be formed of a material capable of shielding magnetic flux.

According to various embodiments, the magnet 240, the yoke 250, and the plate 270 may form a magnetic circuit for driving the speaker unit 200. The voice coil 230 may vibrate by repulsion of the magnetic circuit formed by the magnet 240, the yoke 250, and the plate 270, and the magnetic field formed by the current flow of the voice coil 230.

The shape and structure of the speaker unit 200 shown in FIGS. 2*a* and 2*b* is only an example, and the speaker unit 200 described below is not limited to the shape and structure shown in FIGS. 2*a* and 2*b*. For example, the speaker unit 200 may be changed to the shape and structure shown in FIGS. 6*a* to 6*c*.

Figure 3A:
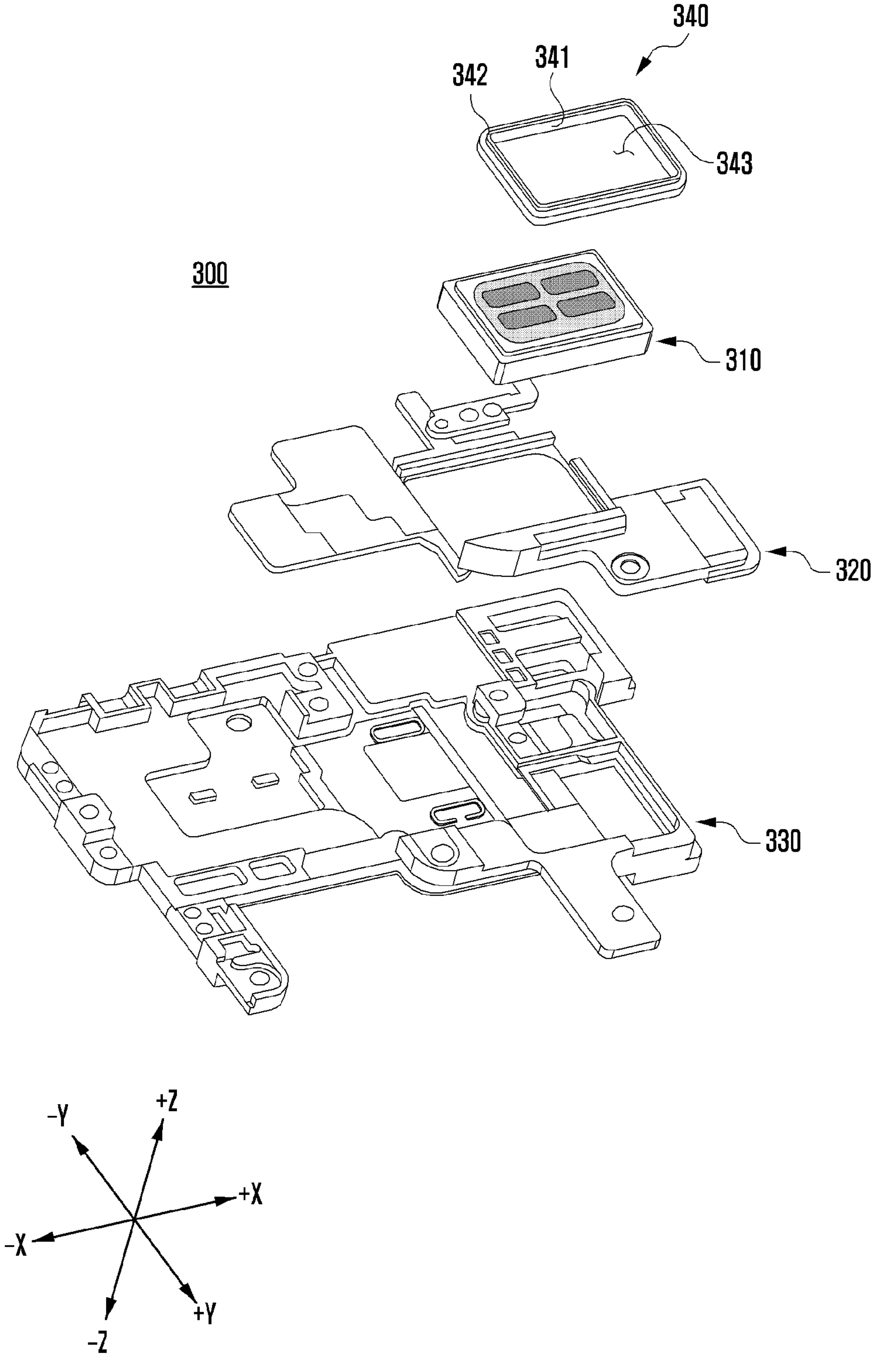
FIG. 3*a* is an exploded perspective view of a speaker module according to various embodiments disclosed in the present document.
Figure 3B:
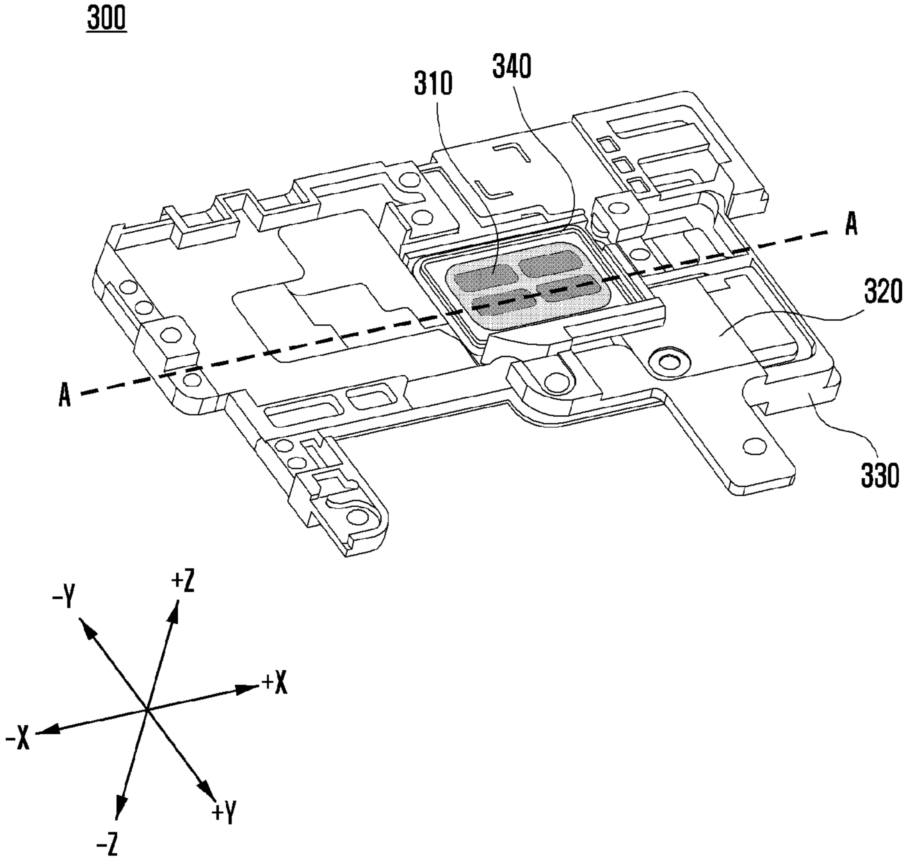
FIG. 3*b* is a perspective view of a speaker module according to various embodiments disclosed in the present document.
Figure 3C:
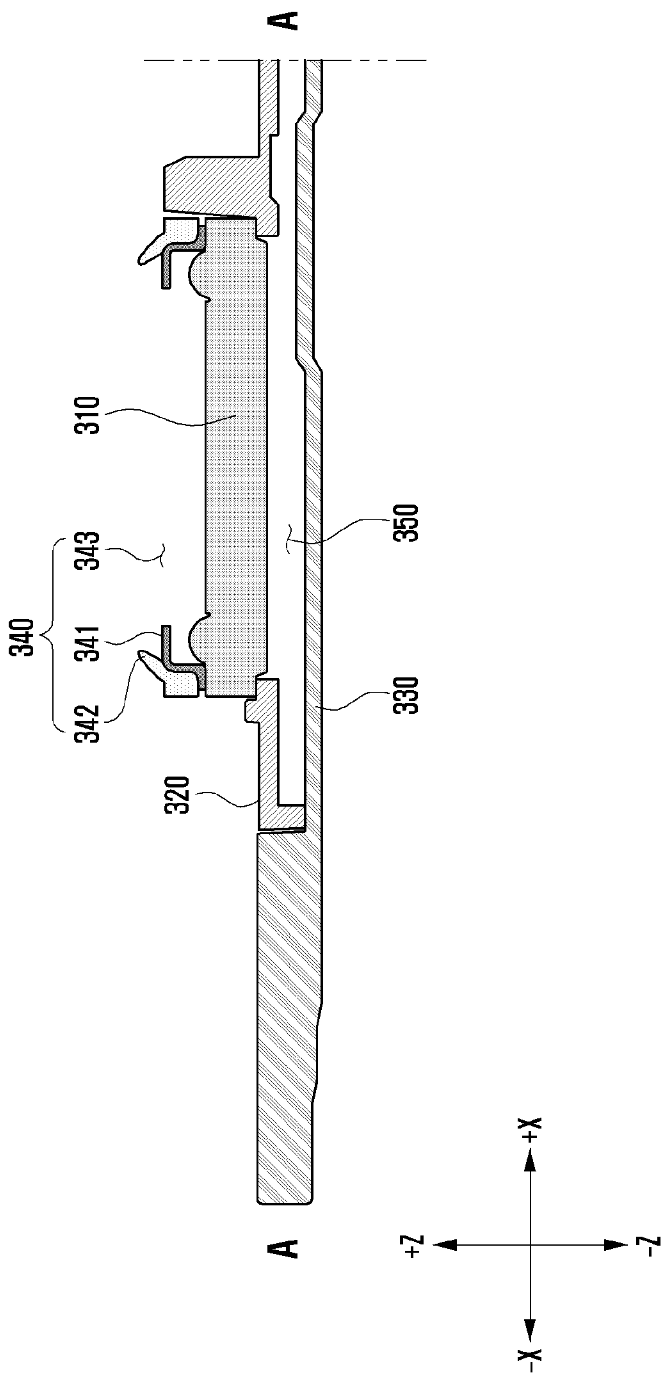
FIG. 3*c* is a cross-sectional view of the speaker module shown in FIG. 3*b* taken along line A-A.

FIG. 3*a* is an exploded perspective view of a speaker module according to various embodiments disclosed in the present document. FIG. 3*b* is a perspective view of a speaker module according to various embodiments disclosed in the present document. FIG. 3*c* is a cross-sectional view of the speaker module shown in FIG. 3*b* taken along line A-A.

According to various embodiments, as shown in FIGS. 3*a* to 3*c*, the speaker module 300 may include a speaker unit 310 (e.g., the speaker unit 200 of FIGS. 2*a* and 2*b*), a first speaker housing 320, a second speaker housing 330, and an airtight member 340. Some of the above-described components may be omitted from the speaker module 300. For example, the speaker module 300 may not include the second speaker housing 330 (refer to FIG. 5*a*).

According to various embodiments, the first speaker housing 320 may be coupled to the speaker unit 310 in a first direction. The first direction may refer to a −Z direction on the basis of FIGS. 3*a* to 3*c*. The first speaker housing 320 and the speaker unit 310 may be coupled in various ways. For example, the first speaker housing 320 and the speaker unit 310 may be coupled to each other through an adhesive material, and the speaker unit 310 may be inserted into the portion formed in the first housing 320 as a shape corresponding to the speaker unit 310. The first speaker housing 320 may accommodate the speaker unit 310. The first speaker housing 320 may be disposed inside an electronic device (e.g., the electronic device 101 of FIG. 1). The first speaker housing 320 may be formed of various materials. For example, it may be formed of a synthetic resin, a metal, or a composite material.

According to various embodiments, the second speaker housing 330 may be coupled to the first speaker housing 320 in the first direction. The second speaker housing 330 and the first speaker housing 320 may be coupled in various ways. For example, the first speaker housing 320 and the second speaker housing 330 may be coupled to each other through an adhesive material, and the first speaker housing 320 may be inserted into the portion formed in the second speaker housing 330 as a shape corresponding to the first speaker housing 320. As another example, the first speaker housing 320 and the second speaker housing 330 may be screwed together. The second speaker housing 330 may be formed of various materials. For example, it may be formed of a synthetic resin, a metal, or a composite material. In an embodiment, the second speaker housing 330 may be formed of the same material as the first speaker housing 320.

According to various embodiments, at least one of electronic components included in the electronic device may be disposed in the second speaker housing 330. For example, an antenna of the electronic device may be disposed in the second speaker housing 330. An antenna may refer to a device connected to a communication module (e.g., the communication module 190 of FIG. 1) of an electronic device to transmit or receive a communication-related signal. In addition, various electronic components may be disposed in the second speaker housing 330.

According to various embodiments, as shown in FIG. 3*c*, a resonance space 350 may be formed between the first speaker housing 320 and the second speaker housing 330. The resonance space 350 may be a space formed by being surrounded by a portion of the first speaker housing 320 and a portion of the second speaker housing 330. At least a portion of the resonance space 350 may be connected to the speaker unit 310. As shown in FIG. 3*c*, the resonance space 350 may be disposed in a first direction with respect to the speaker unit 310. The direction in which the main sound is radiated from the speaker unit 310 may be a second direction opposite to the first direction. The first direction may refer to a −Z direction on the basis of FIGS. 3*a* to 3*c*. The second direction may refer to a +Z direction on the basis of FIGS. 3*a* to 3*c*. The sound generated by the vibration of the diaphragm of the speaker unit 310 may be radiated in the second direction and the first direction. Because the phases of the sound traveling in the second direction and the sound traveling in the first direction are opposite to each other, the sounds traveling in each direction need to be separated from each other. The resonance space 350 may be disposed in a first direction opposite to the second direction, which is the main sound radiation direction of the speaker unit 310, so that the sound radiated in the first direction may be separated from the sound radiated in the second direction. In addition, the resonance space 350 may resonate the sound radiated in the first direction and increase the volume of the sound output to the outside of the electronic device.

According to various embodiments, the first speaker housing 320 of the speaker module 300 may separate the space so that a sound radiated in a first direction from the speaker unit 310 and travelling to the resonance space 350 and a sound travelling in a second direction from the speaker unit 310 may not interfere with each other.

According to various embodiments, the airtight member 340 may be coupled to the speaker unit 310 from the second direction to the first direction. The airtight member 340 may prevent a sound radiated from the speaker unit 310 in the second direction from leaking into an inner space of the electronic device. In addition, the airtight member 340 may block external foreign substances or moisture that may be introduced into the acoustic passage inside the electronic device not to be moved into the inner space by sealing the gap between the acoustic passage (e.g., the acoustic passage 410 of FIG. 4*b*) to be described later and the speaker unit 310.

According to various embodiments, the airtight member 340 may include an airtight frame 341 and an airtight part 342. In an embodiment, the airtight frame 341 may be formed to correspond to the outer periphery of the speaker unit 310. An opening 343 may be formed in the airtight frame 341 so that the sound radiated from the speaker unit 310 in the second direction passes through the airtight member 340. The airtight frame 341 may be formed of a synthetic resin, a metal, or a composite material. In an embodiment, the airtight part 342 may be formed of a material having an elastic force. For example, the airtight part 342 may be formed of a material such as rubber, silicone, or liquid silicone rubber (LSR). The airtight part 342 may be disposed in the airtight frame 341 in a variety of ways. For example, the airtight part 342 may be formed in the airtight frame 341 through a double injection method. The airtight part 342 may seal the acoustic passage by being in close contact with a device forming the acoustic passage. In another embodiment, the airtight member 340 may be formed of a material having an elastic force. For example, the airtight frame 341 and the airtight part 342 described above may be integrally formed, and the airtight frame 341 and the airtight part 342 may be formed of a material having an elastic force. In another embodiment, the airtight frame may be divided into a first airtight frame and a second airtight frame. The second airtight frame may be formed in the first airtight frame through a double injection method, and the airtight part formed of a material having an elastic force may be formed in the first airtight frame or the second airtight frame through a double injection method.

According to various embodiments disclosed in the present document, an acoustic passage through which foreign substances or moisture may be introduced may be sealed by the airtight member 340 coupled to the speaker unit 310. Accordingly, there is no need to dispose a mechanism between the acoustic passage and an opening for radiating sound for blocking an external foreign substance or moisture; thus, the space utilization efficiency of the electronic device may be improved. In addition, because the airtight member 340 performs a sealing by a material having elasticity and does not use an adhesive material of a waterproof material, compression processing for bonding the waterproof material is unnecessary in the assembly process of the speaker module 300 disclosed in the present document. Accordingly, the risk of damage to the electronic component of the electronic device or the speaker module 300 because of the compression process may be eliminated.

Figure 4A:
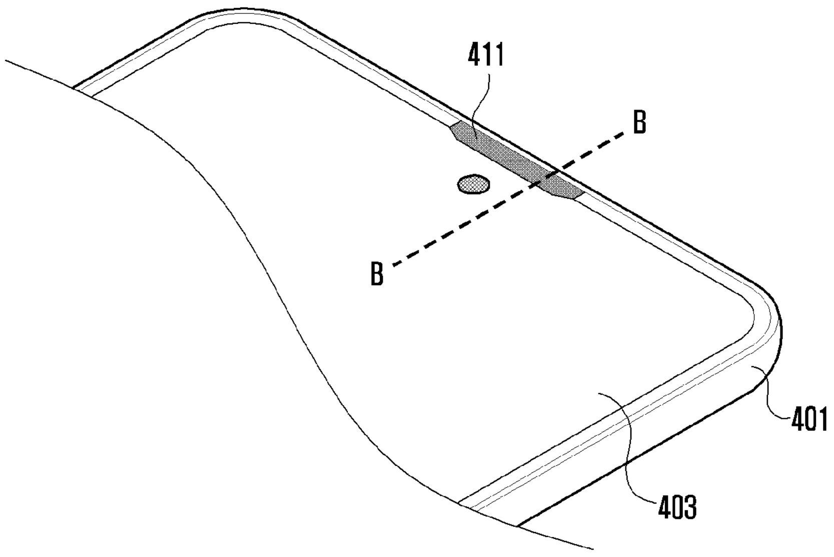
FIG. 4*a* is a perspective view of an electronic device according to various embodiments disclosed in the present document.
Figure 4B:
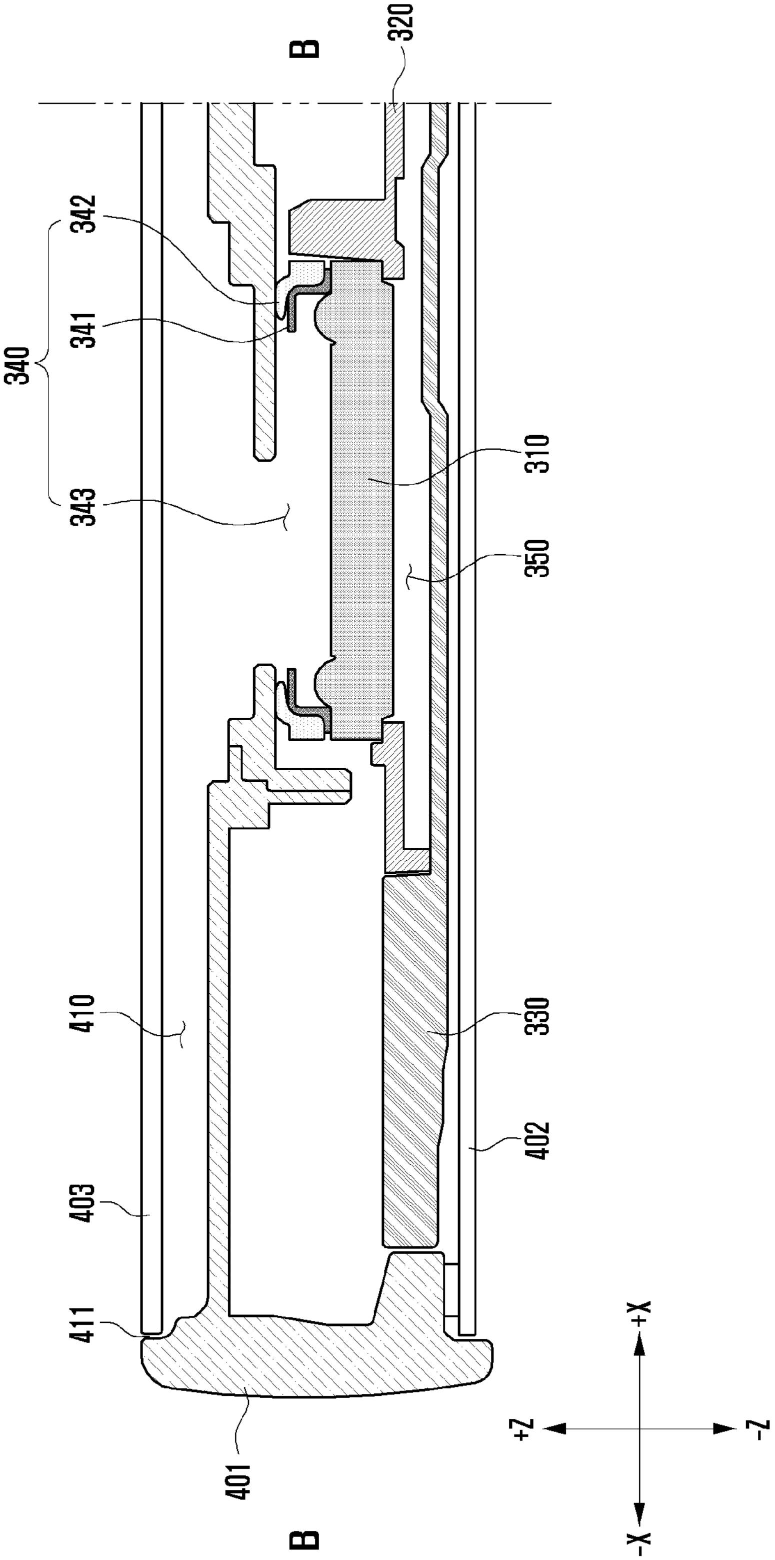
FIG. 4*b* is a cross-sectional view of the electronic device shown in FIG. 4*a* taken along line B-B.

FIG. 4*a* is a perspective view of an electronic device according to various embodiments disclosed in the present document. FIG. 4*b* is a cross-sectional view of the electronic device shown in FIG. 4*a* taken along line B-B. In the following description, the same reference numerals as in FIGS. 3*a* to 3*c* are used for the same or similar components as those described in FIGS. 3*a* to 3*c*, and detailed descriptions thereof will be omitted.

With reference to FIG. 4*b*, the speaker module 300 may be disposed in an inner space of the electronic device. The speaker module 300 may be disposed in the housing 401 of the electronic device so that the position thereof may be fixed. A plate 402 of the electronic device may be disposed in a first direction with respect to the speaker unit 310. The plate 402 of the electronic device may face the second speaker housing 330 of the speaker module 300. The display module 403 of the electronic device may be disposed in a second direction opposite to the first direction with respect to the speaker unit 310. The first direction may refer to a −Z direction on the basis of FIG. 4*b*, and the second direction may refer to a +Z direction on the basis of FIG. 4*b*. In an embodiment, in the second direction of the speaker unit 310, a front plate (not shown) supporting the electronic component (e.g., the display module 403) disposed in the housing of the electronic device or in the front direction of the electronic device (e.g., the +Z direction on the basis of FIG. 4*b*) may be disposed.

According to various embodiments, the acoustic passage 410 may be a space provided between the housing 401 of the electronic device and the display module 403. In an embodiment, in the case that the housing or the front plate (not shown) of the electronic device is disposed in the second direction of the speaker unit 310, the acoustic passage may be a space provided between the housing or the front plate (not shown) of the electronic device. The acoustic passage 410 may be a space through which a sound radiated from the speaker unit 310 in the second direction is transmitted. The airtight member 340 of the speaker module 300 may be disposed between the acoustic passage 410 and the speaker unit 310. The airtight member 340 may seal the gap between the acoustic passage 410 and the speaker unit 310. The airtight member 340 may block external foreign substance or moisture that may be introduced through the acoustic passage 410 not to be transmitted between the acoustic passage 410 and the speaker unit 310. In another embodiment, the acoustic passage 410 may be a space provided between the device supporting the display module 403 and the housing 401 of the electronic device.

According to various embodiments, as shown in FIG. 4*a*, an opening for radiating sound 411 may be an opening provided between the housing 401 of the electronic device and the display module 403. The opening for radiating sound 411 may connect the outside of the electronic device and the acoustic passage 410. In another embodiment, the opening for radiating sound 411 may be a space provided between the device supporting the display module 403 and the housing 401 of the electronic device.

According to various embodiments, the sound radiated in the second direction of the speaker unit 310 may be transmitted to the acoustic passage 410 and output to the outside through the opening for radiating sound 411 connected to the acoustic passage 410. The sound radiated in the first direction of the speaker unit 310 may be radiated to the resonance space 350 formed by the first speaker housing 320 and the second speaker housing 330.

FIGS. 5*a* to 5*d* are cross-sectional views of a speaker module and peripheral components thereof according to various embodiments disclosed in the present document. Hereinafter, differences from the speaker module and the electronic device described with reference to FIGS. 3*a* to 3*c* and FIG. 4*b* will be mainly described.

Figure 5A:
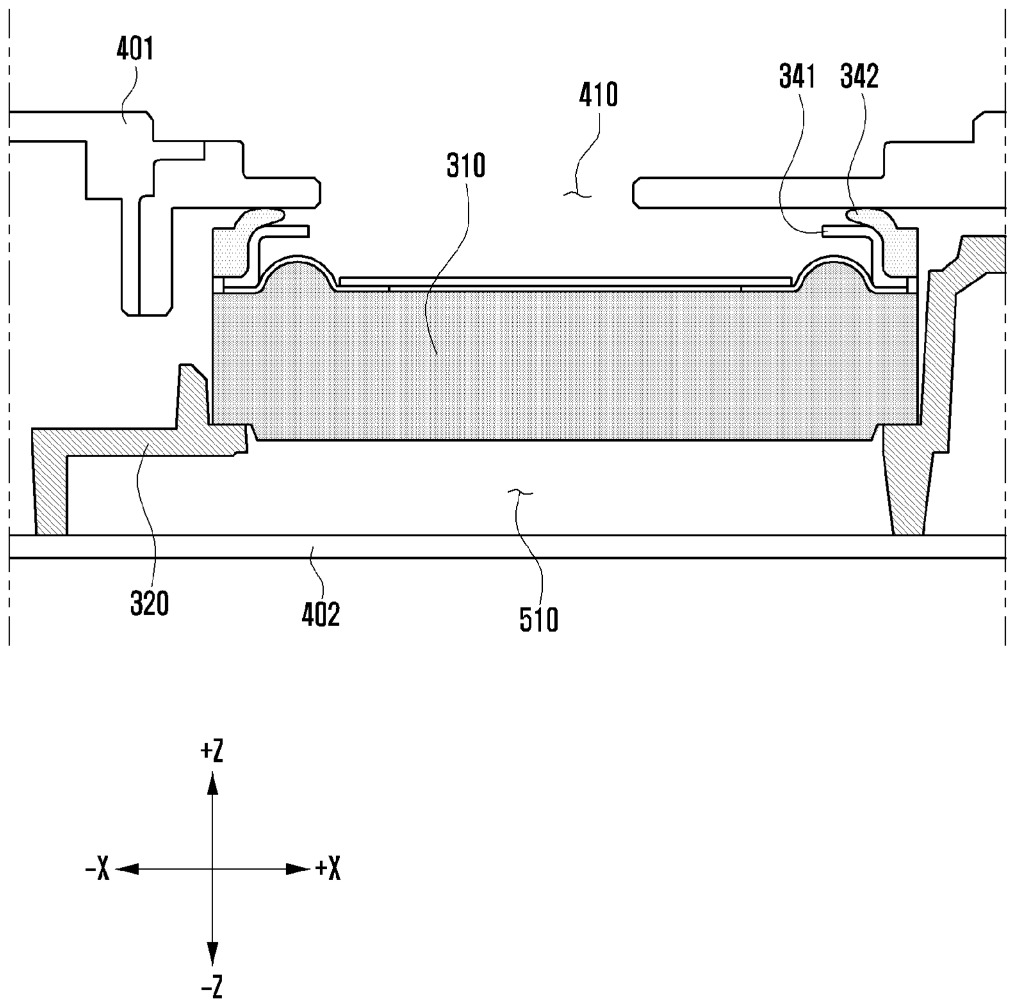
FIGS. 5*a* to 5*d* are cross-sectional views of a speaker module and peripheral components thereof according to various embodiments disclosed in the present document.

According to various embodiments, as shown in FIG. 5*a*, the second speaker housing 330 of the speaker module 300 may be omitted. The first speaker housing 320 of the speaker module 300 may face the plate 402 of the electronic device. In this case, the resonance space 510 for a sound radiated in the first direction (e.g., −Z direction in FIG. 5*a*) of the speaker unit 310 may be a space surrounded by the first speaker housing 320 and the plate 402 of the electronic device.

Figure 5B:
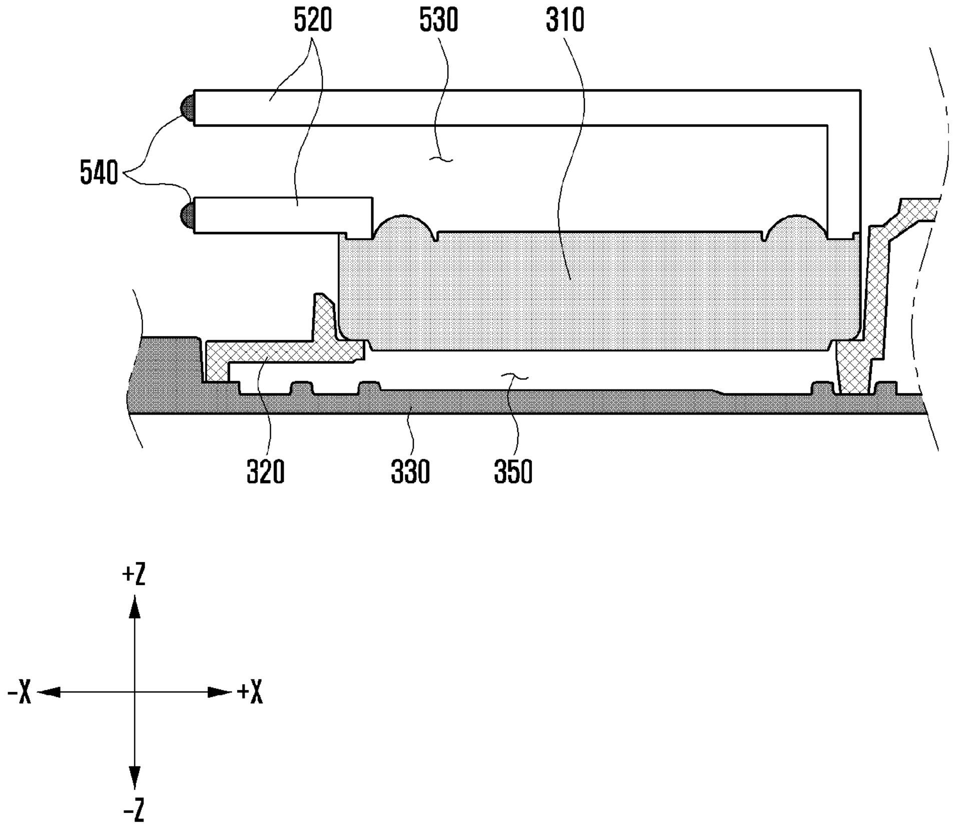

According to various embodiments, as shown in FIG. 5*b*, the speaker module 300 may include a conduit member 520 forming an acoustic passage 530. The conduit member 520 may be coupled to the speaker unit 310 and form an acoustic passage 530 that transmits the sound radiated from the speaker unit 310 in the direction in which the opening for radiating sound (e.g., the opening for radiating sound 411 in FIG. 4*b*) is disposed. In this embodiment, the airtight member 540 may be disposed on the conduit member 520. The airtight member 540 may be formed of a material having an elastic force. For example, the airtight member 540 may be formed of a material such as rubber, silicone, or liquid silicone rubber (LSR). The airtight member 540 may be formed in the conduit member 520 through a double injection method. The airtight member 540 may seal the gap between the conduit member 520 and the device in contact with the conduit member 520.

Figure 5C:
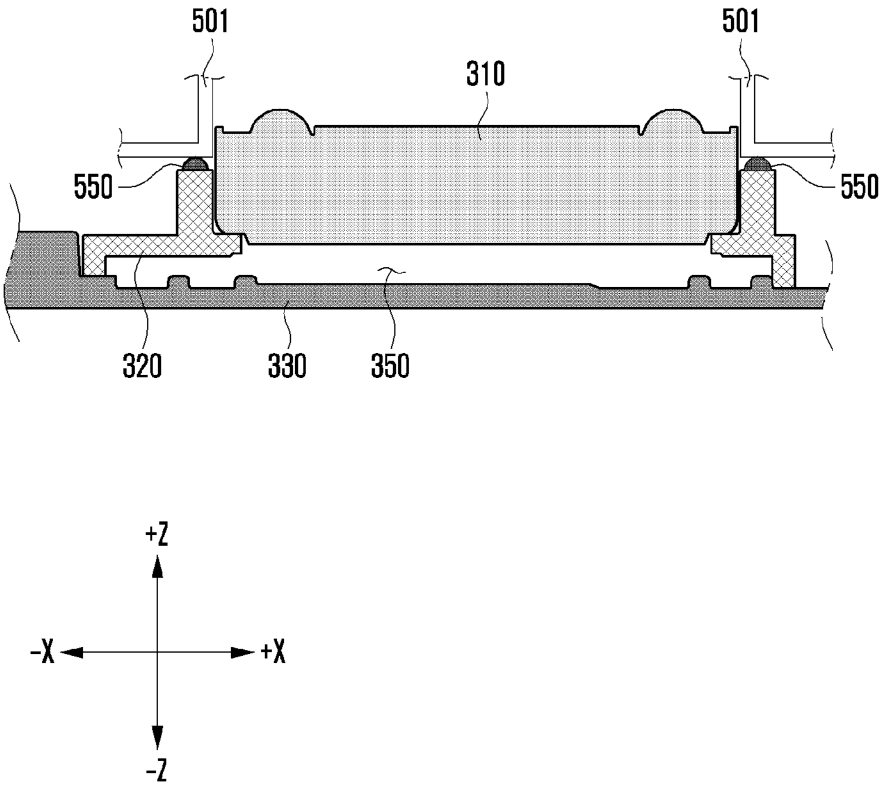
Figure 5D:
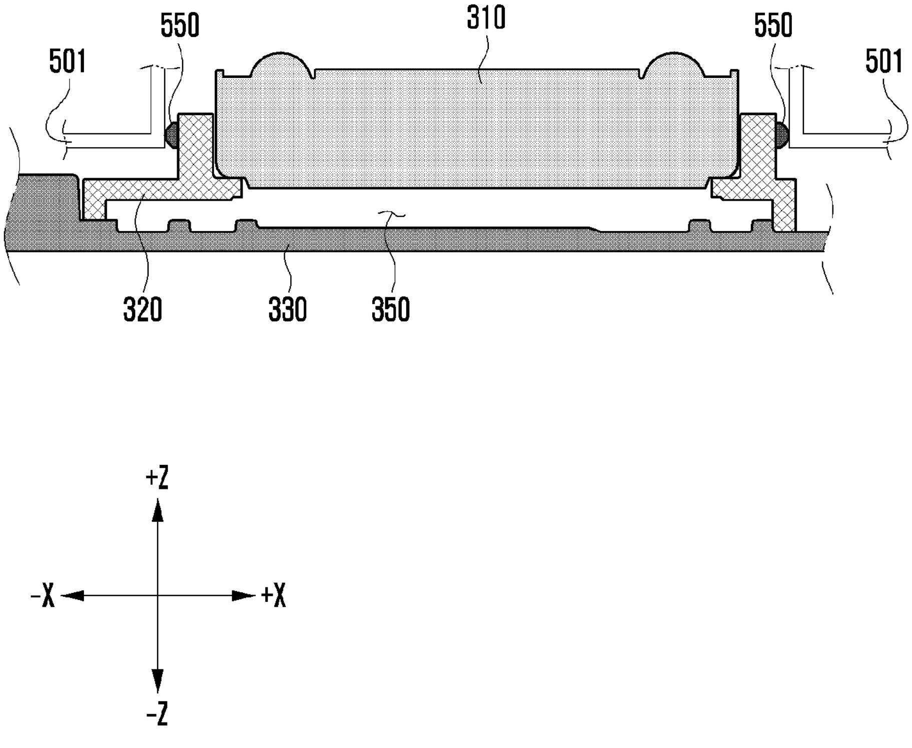

According to various embodiments, as shown in FIGS. 5*c* and 5*d*, the airtight member 550 may be disposed in the first speaker housing 320 of the speaker module 300. The airtight member 550, for example, may be disposed in the +Z direction on the basis of FIG. 5*c* in the first speaker housing 320 as shown in FIG. 5*c*, and it may be disposed in the +X direction and the −X direction on the basis of FIG. 5*d* in the first speaker housing 320 as shown in FIG. 5*d*. As such, the airtight member 550 may be disposed at a position capable of sealing the gap between the first speaker housing 320 and the housing 501 of the electronic device, and it may seal between the housing 501 and the first speaker housing 320 of the electronic device. The airtight member 550 may be formed of a material having an elastic force. For example, the airtight member 550 may be formed of a material such as rubber, silicone, or liquid silicone rubber (LSR). The airtight member 550 may be formed in the first speaker housing 320 through a double injection method.

Figure 6A:
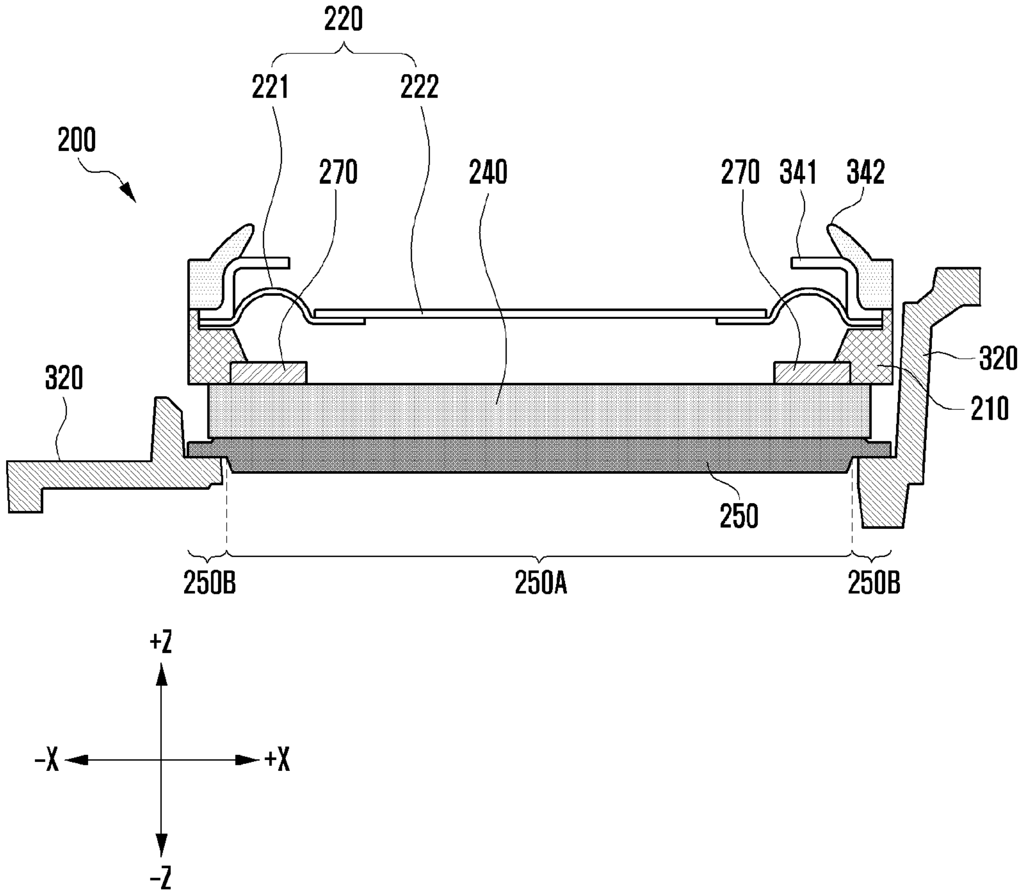
FIGS. 6*a* to 6*c* are diagrams for explaining a coupling relationship between a speaker unit and a first speaker housing according to various embodiments disclosed in the present document.
Figure 6B:
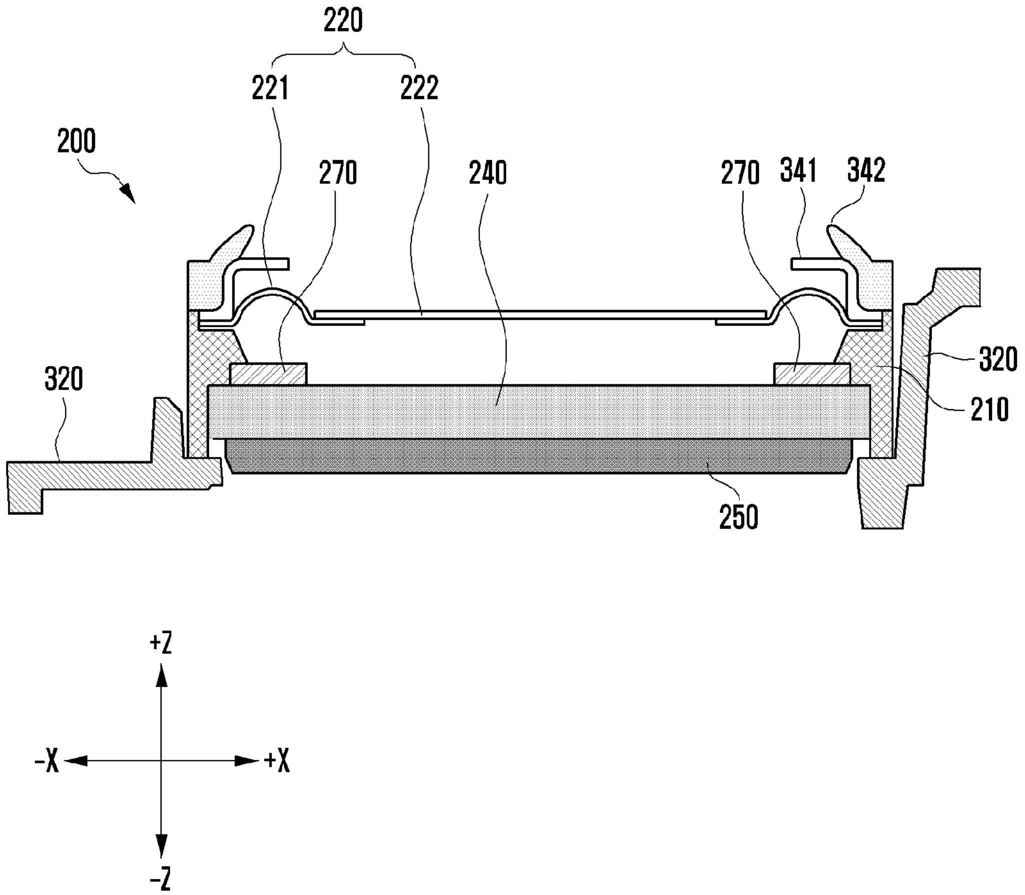
Figure 6C:
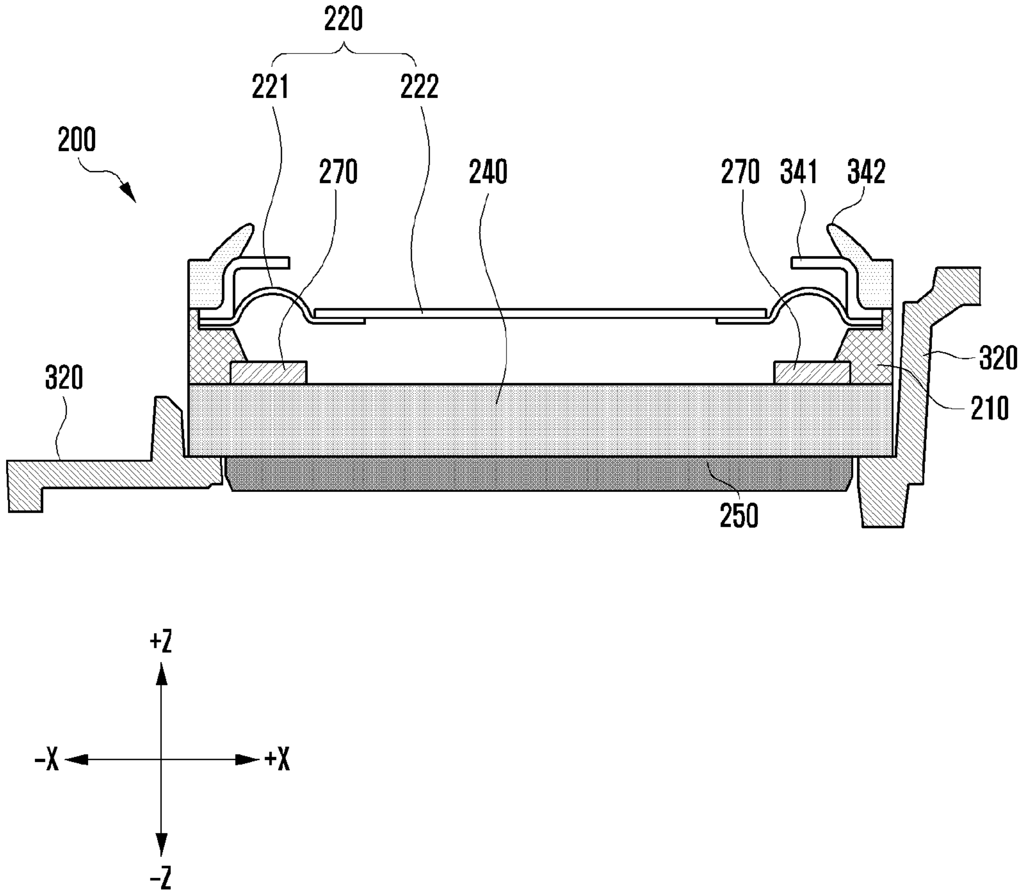

FIGS. 6*a* to 6C are diagrams for explaining a coupling relationship between a speaker unit and a first speaker housing according to various embodiments disclosed in the present document. The reference numbers of the speaker units described below use the reference numbers of the speaker units shown in FIGS. 2*a* and 2*b*.

According to various embodiments, the speaker unit 200 may be coupled to the first speaker housing 320 in various ways. The shape of the speaker unit 200 may be variously changed in consideration of coupling with the first speaker housing 320.

For example, the yoke 250 of the speaker unit 200 may have a stepped design. As shown in FIG. 6*a*, the yoke 250 may include a first yoke part 250A and a second yoke part 250B. The thickness of the second yoke part 250B may be smaller than the thickness of the first yoke part 250A. A step may be formed between the first yoke part 250A and the second yoke part 250B. A portion of the first speaker housing 320 may be coupled to the second yoke unit 250B of the yoke 250. A portion of the first speaker housing 320 and the second yoke unit 250B may be coupled in various ways. For example, the first speaker housing 320 and the second yoke unit 250B may be bonded to each other by bonding using a material having an adhesive force.

As another example, a portion of the first speaker housing 320 may be coupled to the unit frame 210 of the speaker unit 200. The unit frame 210 of the speaker unit 200 may extend in the +Z direction on the basis of FIG. 6*b* to be coupled to a portion of the first speaker housing 320. A portion of the first speaker housing 320 and the unit frame 210 may be coupled in various ways. For example, the first speaker housing 320 and the unit frame 210 may be bonded to each other by using a material having an adhesive force.

As another example, a portion of the first speaker housing 320 may be coupled to the magnet 240 of the speaker unit 200. The magnet 240 of the speaker unit 200 may extend in the X-axis direction on the basis of FIG. 6*c*. A portion of the first speaker housing 320 and the magnet 240 may be coupled in various ways. For example, the first speaker housing 320 and the magnet 240 may be bonded to each other by an adhesive material. In an embodiment, the portion coupled to the magnet 240 in the first speaker housing 320 may be formed of a material capable of shielding magnetic force.

According to various embodiments, a sound may be radiated in a first direction (−Z direction on the basis of FIGS. 6*a* to 6*c*) by vibration of the diaphragm included in the speaker unit 200, and a sound may be radiated from the speaker unit 200 in a second direction (+Z direction on the base of FIGS. 6*a* to 6*c*) that is opposite to the first direction. The first speaker housing 320 may be coupled to the speaker unit 200, and it may separate the space through which the sound radiated in the first direction is transmitted and the space through which the sound radiated in the second direction is transmitted so that the sound radiated in the first direction and the sound radiated in the second direction may not be canceled in meeting each other.

An electronic device according to various embodiments disclosed in the present document comprises a speaker module which includes a speaker unit and a first speaker housing that is coupled to the speaker unit in a first direction and accommodates the speaker unit, and which is arranged in the inner space of the electronic device; an opening for radiating sound for allowing the inner space of the electronic device to communicate with the outside; and an acoustic passage for connecting the opening for radiating sound and a portion from which a sound is radiated by the speaker unit of the speaker module, wherein the speaker module can further include an airtight member for sealing a gap between the speaker module and the acoustic passage so that the sound radiated from the speaker unit is transmitted to the acoustic passage.

In addition, the airtight member of the speaker module may be disposed in the first speaker housing.

In addition, the speaker module may further include a conduit member forming the acoustic passage, and the airtight member of the speaker module may be disposed in the conduit member.

In addition, the speaker module may further include a second speaker housing coupled to the first speaker housing in the first direction and a resonance space formed by the first speaker housing and the second speaker housing.

In addition, at least one electronic component included in the electronic device may be disposed in the second speaker housing of the speaker module.

In addition, an antenna of the electronic device may be disposed in the second speaker housing of the speaker module.

In addition, the airtight member of the speaker module may include the airtight frame that is disposed on the speaker unit formed to correspond to the outer periphery of the speaker unit and the airtight part disposed in the airtight frame to seal the gap between the airtight frame and the acoustic passage and formed of a material having an elastic force.

In addition, the speaker unit of the speaker module may include a unit frame, a diaphragm at least partially fixed to the unit frame, a voice coil coupled to the diaphragm, a magnet disposed adjacent to the voice coil, and a yoke accommodating the magnet.

In addition, the yoke of the speaker unit of the speaker module may include a first yoke part and a second yoke part having a thickness smaller than a thickness of the first yoke part, and at least a portion of the first speaker housing of the speaker module may be disposed on the second yoke part of the yoke of the speaker unit.

In addition, at least a portion of the first speaker housing of the speaker module may be disposed in a unit frame of the speaker unit.

In addition, at least a portion of the first speaker housing of the speaker module may be disposed on a magnet of the speaker unit, at least a portion of which protrudes to an outer surface of the speaker unit.

A speaker module according to various embodiments disclosed in the present document may further include a speaker unit, a first speaker housing that is coupled to the speaker unit in a first direction and accommodates the speaker unit, and an airtight member for sealing the acoustic passage connecting the speaker unit and a portion from which a sound is radiated by the speaker unit.

In addition, the airtight member may include the airtight frame that is disposed on the speaker unit formed to correspond to the outer periphery of the speaker unit and the airtight part disposed in the airtight frame to seal the gap between the airtight frame and the acoustic passage and formed of a material having an elastic force.

In addition, the airtight member may be disposed in the first speaker housing.

A conduit member forming the acoustic passage may be further included and the airtight member may be disposed on the conduit member.

A second speaker housing coupled to the first speaker housing in the first direction and a resonance space formed by the first speaker housing and the second speaker housing may be further included.

In addition, an antenna of an electronic device including the speaker module may be disposed in the second speaker housing.

In addition, the speaker unit may include a unit frame, a diaphragm at least partially fixed to the unit frame, a voice coil coupled to the diaphragm, a magnet disposed adjacent to the voice coil, and a yoke accommodating the magnet.

In addition, the yoke of the speaker unit may include a first yoke part and a second yoke part having a thickness smaller than a thickness of the first yoke part, and at least a portion of the first speaker housing may be disposed on the second yoke part of the yoke of the speaker unit.

In addition, at least a portion of the first speaker housing may be disposed on a magnet of the speaker unit, at least a portion of which protrudes to an outer surface of the speaker unit Also, embodiments disclosed in the specification and drawings of this document are merely presented as specific examples to easily explain the technical content according to the embodiments of the disclosure and help an understanding of the embodiments of the disclosure, but they are not intended to limit the scope of the embodiments of the disclosure. Therefore, all changes or modifications derived from the technical ideals of the various embodiments of the disclosure should be interpreted to be included in the scope of the various embodiments of the disclosure in addition to the embodiments disclosed in the present document.

The invention claimed is:

1. An electronic device comprising:
- a speaker module disposed in an inner space of the electronic device and including a speaker unit and a first speaker housing coupled to a first surface of the speaker unit;
- an opening for radiating sound connecting the inner space of the electronic device with an outside area external to the electronic device;
- an acoustic passage connecting the opening for radiating sound and a portion of a second surface of the speaker unit from which sound is radiated, the second surface being opposite to the first surface; and
- a resonance space formed by the first surface of the speaker unit and the first housing,
- wherein the speaker module further includes an airtight member which seals a gap between the speaker module and the acoustic passage so that the sound radiated from the second surface of the speaker unit is transmitted to the acoustic passage.

2. The electronic device of claim 1, wherein the airtight member of the speaker module is disposed at the speaker unit.

3. The electronic device of claim 1, wherein the speaker module comprises further a conduit member forming the acoustic passage, and the airtight member of the speaker module is disposed on the conduit member.

4. The electronic device of claim 1, wherein the speaker module comprises further a second speaker housing coupled to the first speaker housing, at least a portion of the second speaker housing facing the first surface of the speaker unit, and
- wherein the resonance space is formed by the first surface of the speaker unit, the first speaker housing, and the second speaker housing.

5. The electronic device of claim 4, wherein at least one electronic component is disposed at the second speaker housing of the speaker module.

6. The electronic device of claim 4, wherein an antenna of the electronic device is disposed at the second speaker housing of the speaker module.

7. The electronic device of claim 1, wherein the airtight member of the speaker module comprises:
- an airtight frame corresponding to an outer periphery of the speaker unit and disposed at the speaker unit; and
- an airtight part disposed at the airtight frame to seal a gap between the airtight frame and the acoustic passage, the airtight part formed of a material having an elastic force.

8. The electronic device of claim 7, wherein the airtight frame is a single airtight frame having an opening configured to radiate the sound therethrough and towards the acoustic passage.

9. The electronic device of claim 7, wherein the airtight frame includes:
- a first airtight frame accommodating an outer periphery of the speaker unit; and
- a second airtight frame coupled in the first airtight frame portion, each of the first and second airtight frames having an opening configured to radiate the sound therethrough and towards the acoustic passage.

10. The electronic device of claim 1, wherein the speaker unit of the speaker module comprises:
- a unit frame;
- a diaphragm at least partially fixed to the unit frame;
- a voice coil coupled to the diaphragm;
- a magnet disposed adjacent to the voice coil; and
- a yoke accommodating the magnet.

11. The electronic device of claim 10, wherein the yoke of the speaker unit of the speaker module comprises:
- a first yoke part having a first thickness; and
- a second yoke part having a second thickness smaller than the first thickness of the first yoke part, wherein
- at least a portion of the first speaker housing of the speaker module is disposed on the second yoke part of the yoke of the speaker unit.

12. The electronic device of claim 10, wherein at least a portion of the first speaker housing of the speaker module is disposed on the unit frame of the speaker unit.

13. The electronic device of claim 10, wherein at least a portion of the first speaker housing of the speaker module is disposed on the magnet of the speaker unit, at least a portion of which protrudes toward an outer surface of the speaker unit.

14. The electronic device of claim 1, further comprising:
a display module covering the speaker housing.

15. A speaker module comprising:
a speaker unit;
a first speaker housing coupled to a first surface of the speaker unit; and
an acoustic passage extending from the speaker unit to radiate sound from a second surface of the speaker unit, the second surface being opposite to the first surface;
a resonance space formed by the first surface of the speaker unit and the first housing; and
an airtight member sealing a gap between the speaker unit and the acoustic passage so that the sound radiated from the second surface of the speaker unit is transmitted to the acoustic passage.

16. The speaker module of claim 15, wherein the airtight member comprises an airtight frame formed to correspond to an outer periphery of the speaker unit and disposed on the speaker unit.

17. The speaker module of claim 15, wherein the airtight member is disposed at the first speaker housing.

18. The speaker module of claim 15, further comprising a conduit member forming the acoustic passage, wherein the airtight member is disposed on the conduit member.

* * * * *